United States Patent
Baum et al.

(10) Patent No.: US 8,495,091 B2
(45) Date of Patent: Jul. 23, 2013

(54) DYNAMICALLY ROUTING DATA RESPONSES DIRECTLY TO REQUESTING PROCESSOR CORE

(75) Inventors: Allen J. Baum, Palo Alto, CA (US); Sailesh Kottapalli, San Jose, CA (US); Vedaraman Geetha, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 13/175,772

(22) Filed: Jul. 1, 2011

(65) Prior Publication Data

US 2013/0007046 A1    Jan. 3, 2013

(51) Int. Cl.
*G06F 17/30*    (2006.01)

(52) U.S. Cl.
USPC ............................. 707/770; 707/758; 370/392

(58) Field of Classification Search
USPC ..... 707/758, 770, 999.003, 999.001; 370/392
See application file for complete search history.

(56) References Cited

U.S. PATENT DOCUMENTS

| | | | | |
|---|---|---|---|---|
| 5,448,730 A * | 9/1995 | Bakita et al. | | 718/107 |
| 6,615,045 B1 * | 9/2003 | Rollender | | 455/445 |
| 7,362,702 B2 * | 4/2008 | Terrell et al. | | 370/230 |
| 7,398,360 B2 * | 7/2008 | Hetherington et al. | | 711/141 |
| 7,493,416 B2 * | 2/2009 | Pettey | | 709/250 |
| 7,600,078 B1 * | 10/2009 | Cen et al. | | 711/137 |
| 8,040,888 B1 * | 10/2011 | MacAdam et al. | | 370/392 |
| 8,150,434 B2 * | 4/2012 | Suzuki | | 455/507 |
| 2005/0135379 A1 * | 6/2005 | Callaway et al. | | 370/395.31 |
| 2009/0164751 A1 * | 6/2009 | Harikumar et al. | | 712/1 |
| 2011/0047413 A1 * | 2/2011 | McGill et al. | | 714/15 |
| 2011/0087841 A1 * | 4/2011 | Toh et al. | | 711/122 |
| 2011/0153893 A1 * | 6/2011 | Foong et al. | | 710/268 |

* cited by examiner

*Primary Examiner* — Debbie Le
(74) *Attorney, Agent, or Firm* — Caven & Aghevli LLC (57) ABSTRACT

Methods and apparatus relating to dynamically routing data responses directly to a requesting processor core are described. In one embodiment, data returned in response to a data request is to be directly transmitted to a requesting agent based on information stored in a route back table. Other embodiments are also disclosed.

20 Claims, 6 Drawing Sheets

DYNAMICALLY ROUTING DATA RESPONSES DIRECTLY TO REQUESTING PROCESSOR CORE

FIELD

The present disclosure generally relates to the field of electronics. More particularly, an embodiment of the invention relates to dynamically routing data responses directly to a requesting processor core.

BACKGROUND

In computing systems with multiple processors, inter-processor communication latency may directly effect how the computing system performs as a whole. Such systems may also include caches that are shared between the processors. When data associated with a cache miss is returned from a remote processor, it may be first sent to the cache that missed and then forwarded to the requesting processor. Accordingly, performance of computing systems with multiple processors may suffer greatly if servicing of cache misses is not handled efficiently.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments may improve processor performance by reducing memory latency. For example, an embodiment reduces the latency of data returning from an external socket directly to the processor core that requested it (called Direct-to-Core or D2C) in a scalable manner. However, the cost and/or size of the logic that implements some embodiments may not scale with the size of the system.

Moreover, some implementations may build a table that is written on an outgoing request. For example, the table records the requesting processor core and a corresponding request identifier (requestID) associated with the outgoing request. When data associated with the outgoing request returns, the table is looked up using the requestID as an input and returned data is sent to the requesting processor core recorded in the table. However, if the number of possible requestIDs is very large (e.g., the number of other sockets becomes large), then this table may become too large to implement. To this end, an embodiment utilizes a table (referred to herein as a Route Back Table or RBT, such as RBT 122) used to route data back to the requesting processor core, where the RBT is implemented with a relatively much smaller size than the number of outstanding requests (e.g., at the cost of possibly not performing D2C on all requests).

Generally, cache memory in computing systems may be kept coherent using a snoopy bus or a directory based protocol. In either case, a system memory address may be associated with a particular location in the system. This location is generally referred to as the "home node" of the memory address. In a directory based protocol, processing/caching agents may send requests to the home node for access to a memory address with which a "home agent" (or HA) is associated. Moreover, in distributed cache coherence protocols, caching agents (CAs) may send requests to home agents which control coherent access to corresponding memory spaces (e.g., a subset of the memory space served by the collocated memory controller). Home agents are, in turn, responsible for ensuring that the most recent copy of the requested data is returned to the requestor either from memory or a caching agent which owns the requested data. The home agent may also be responsible for invalidating copies of data at other caching agents if the request is for an exclusive copy, for example. For these purposes, a home agent generally may snoop every caching agent or rely on a directory (also referred to as a "directory cache (not shown))" or a copy of this directory stored in a memory, such as memory 120 of FIG. 1) to track one or more caching agents where the data may reside. In an embodiment, the directory cache may include a full or partial copy of the directory stored in the memory 120.

Figure 1:
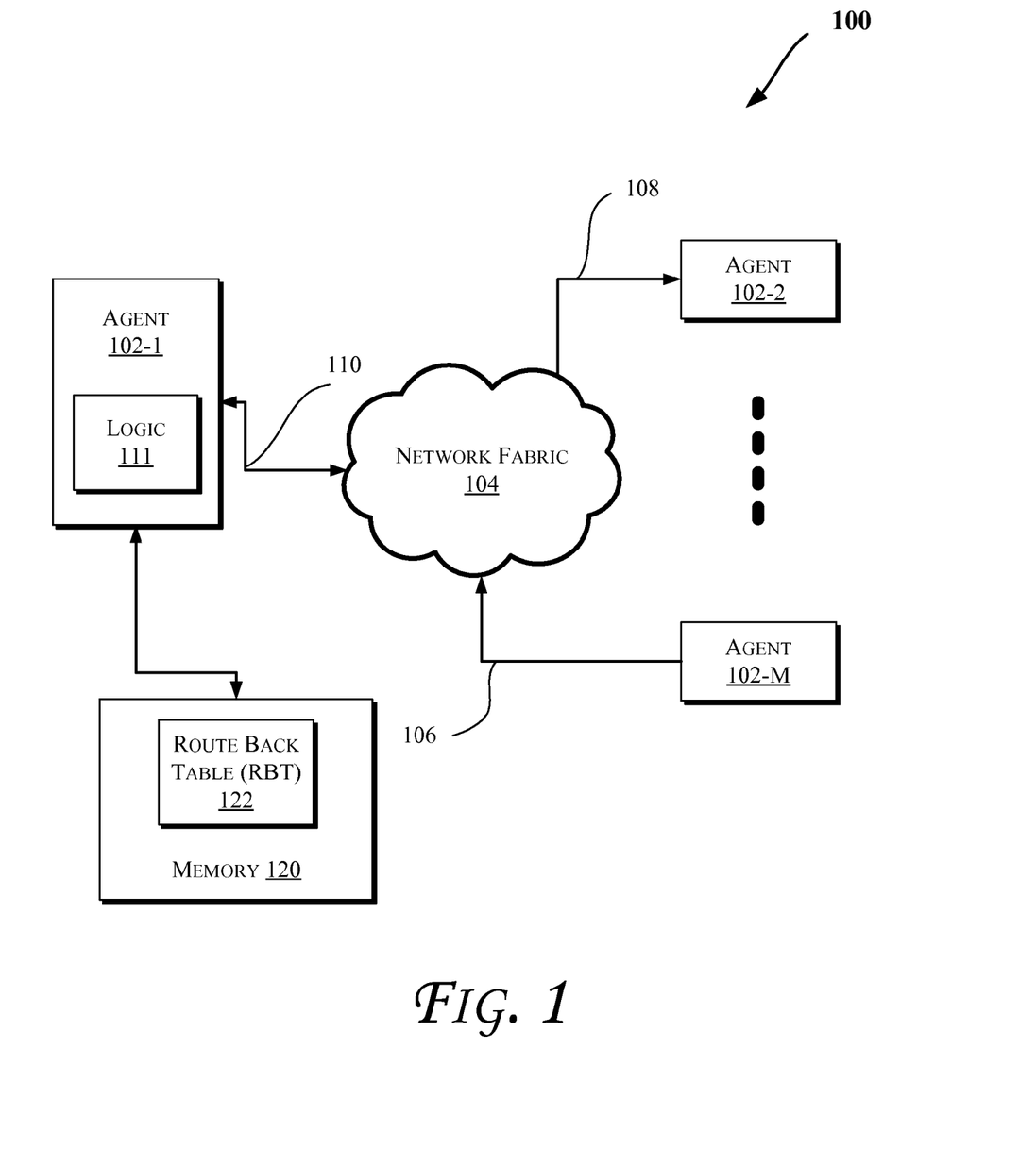
FIGS. 1-2 and 5-6 illustrate block diagrams of embodiments of computing systems, which may be utilized to implement various embodiments discussed herein.

Various computing systems may be used to implement embodiments, discussed herein, such as the systems discussed with reference to FIGS. 1 and 5-6. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 5-6.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with Fully Buffered Dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may include or have access to a logic 111 to provide for access to the RBT 122, as discussed herein, e.g., with reference to FIGS. 3-6. Further, in an embodiment, one or more of the agents 102 (only one shown for agent 102-1) may have access to a memory (which may be dedicated to the agent or shared with other agents) such as memory 120. In some embodiments, each or at least one of the agents 102 may be coupled to the memory 120 and/or a corresponding RBT 122 that is either on the same die as the agent or otherwise accessible by the agent.

Figure 2:
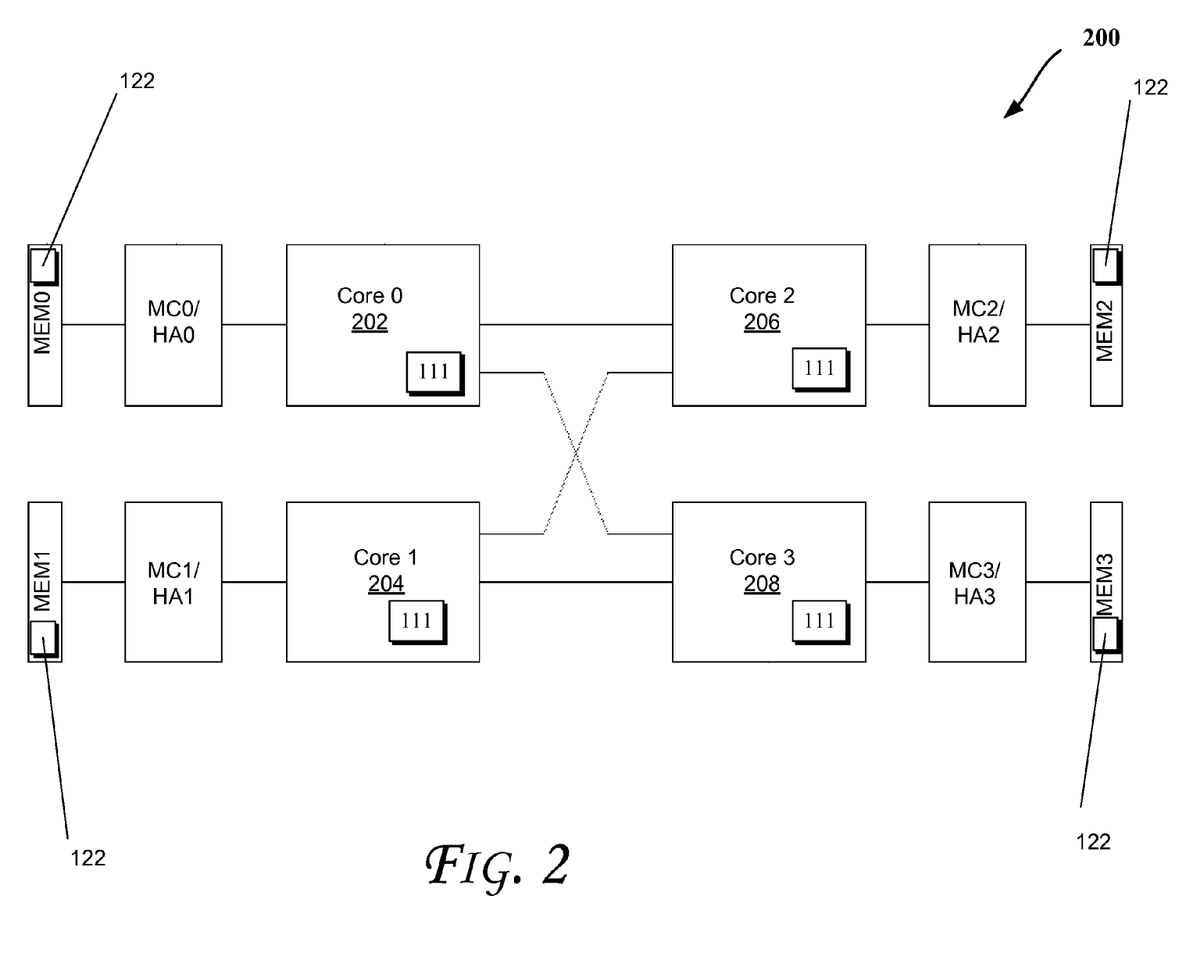

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 6. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 612 of FIG. 6). In some embodiments, the memory controller (MC)/Home Agent (HA) (such as MC0/HA0 through MC3/HA3) may be the same or similar to agent 102-1 of FIG. 1 (e.g., including logic 111, etc.) and the memory, labeled as MEM0 through MEM3, may be the same or similar to memory 120 of FIG. 1 (e.g., including RBT 122 such as shown). Further, logic 111 may be provided in the processor cores 202-208 such as shown in FIG. 2. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links. Also, the directory associated with memory controller MC3/HA3 may initialized in the unknown (U)-state upon a copy to mirror. Upon failover to this controller (e.g., due to an online service-call for this memory controller), the directory may be reconstructed from the U-state.

Figure 3:
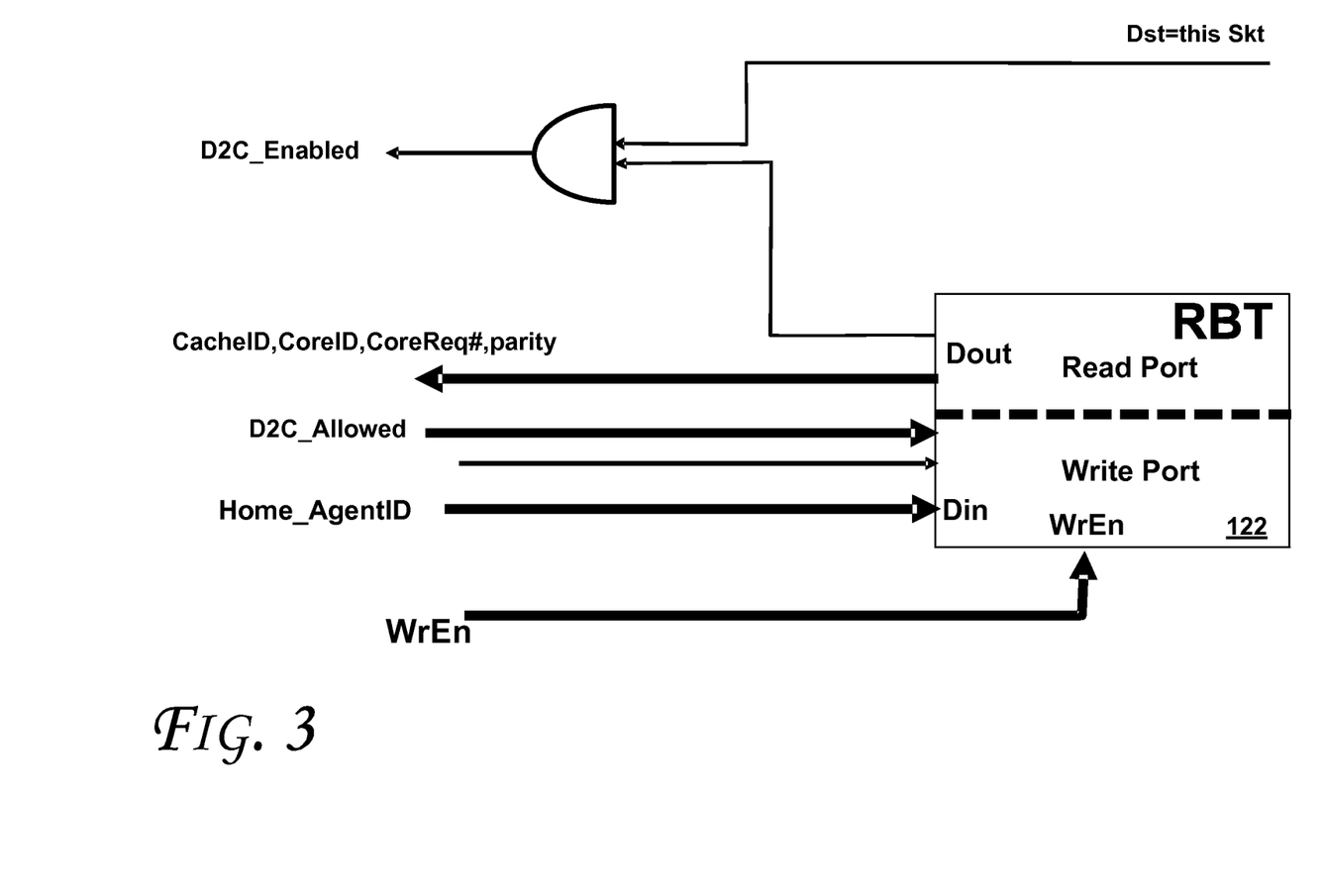
FIGS. 3-4 illustrate circuit diagrams according to some embodiments.
Figure 4:
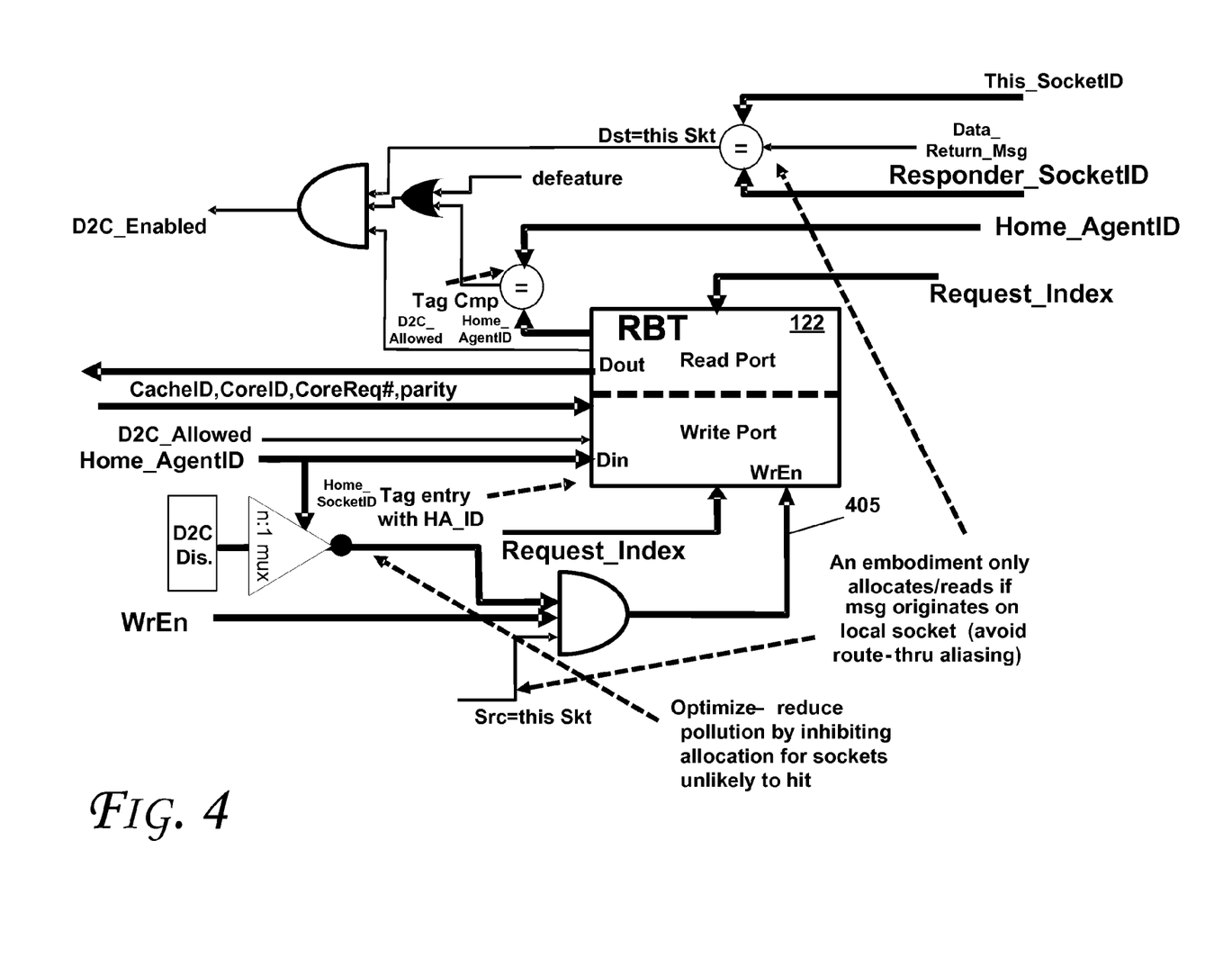

FIGS. 3 and 4 illustrate block diagrams of the RBT and circuitry for a system with two sockets and one HA and a system with more than two sockets and one HA, respectively, according to some embodiments. As discussed herein (e.g., with reference to FIGS. 3-4), "Din" refers to data input, "Dout" refers to data output, "Cmp" refers to a compare operation, "mux" refers to a multiplexer, "Dis" refers to disabled, "Src" refers to source, and "WrEn" refers to write enable.

Referring to FIGS. 3-4, the RBT 122 may include one or more read ports and/or write ports, e.g., to handle multiple read/write operations in a single cycle. In accordance with an embodiment, each entry in the RBT 122 may include one or more of: Cache ID, Core ID, Core Request number, a D2C Enabled bit, and a parity bit. The bottom portions of these figures indicate whether information is to be written to the RBT 122 (e.g., based on status of the WrEn signal) and the top portions indicate information to be read from the RBT 122. As shown, the D2C Enabled signal may be determined based various items. The D2C Allowed signal is fed to the write port of the RBT along with the Home Agent ID, request index, etc. If the WrEn signal (in FIG. 3) and final WrEn signal 405 are asserted, the information is written to the RBT 122. Further, the top portion of FIGS. 3-4 generally indicate whether a tag match has occurred and table information is to be read and used for a D2C operation. In an embodiment, if the tag does not match, information is still read and used to send data to the Cache, but not the core. The defeature signal in FIG. 4 indicates whether to assume a tag match without tag checking. In an embodiment, when read/write operations to the same entry are performed at the same time, the cache (bank) number (CacheID) is turned around in the same cycle and D2C is forced to disable (D2C Dis. box). Also, when one or more write operations to a particular entry collide in the same cycle, one or more of the colliding write operations may be dropped without compromising correctness. Also, as shown in FIG. 4, if it is determined that data being written has come from a different socket, then the information is not entered in RBT 122 in an embodiment.

In an embodiment, the RBT 122 may be built as a cache (e.g., a Static Random Access Memory (SRAM) shared amongst a plurality of processor cores in an embodiment) instead of a direct lookup table (e.g., implemented as a RAM). This is envisioned to allow for multiple write operations to the same location of the RBT 122 in the same or different clock cycles. An embodiment may use the destination of the request (e.g., a destination identifier such as a socket ID, memory controller ID, etc.) as a tag and the requestID as an index. Accordingly, returning data may index into the RBT table 122 using the requestID, and if the entry is valid and the Home Agent tag written when the request message was sent matches the Home Agent ID of the returning data (which may be different than the actual sender of the message) and the target of the message is the local socket, then the requesting processor core ID (coreID) is read from the RBT 122 and used to send the returned data directly to the requesting processor core, e.g., in addition to sending the returned data to the cache bank/controller. In various embodiments, the returned data may be sent directly to the requesting processor core either at the same time, prior to, or after sending the returned data to the cache bank/controller.

In various embodiment, the returned data may fail to be returned directly to the requesting processor core (or otherwise be returned indirectly (e.g., after storage in a cache (bank) as discussed above) to the requesting processor core) if: (1) it is returned using a path that is different than the path used to send the message, and the implementation does not forward requesting core information to other paths; (2) a subsequent request overwrites an existing request (e.g., the same requestID, but a different target); (3) the request does not target a processor core (e.g. is a prefetch that is only stored in the cache); and/or (4) there is not enough buffering of bandwidth to send data to both the cache controller and to the core. In some embodiments: the returned data is indirectly sent to the requesting processor core in response to one or more of: a tag mismatch due to the outgoing request being sent on a different link, a tag mismatch due to the tag being overwritten, a tag mismatch due to the tag not having been written based on some function of a target, due to the request indicating that data be returned indirectly, due to a read or write collision, and due to a destination not being a current socket. Furthermore, some embodiments may utilize any valid cache organization, for example including: direct mapped, set-associative, fully associative, sectored, etc. Also, the index and tags could be any combination of target and requestID. As discussed herein, the terms "target" and "tag" may be interchangeable.

As shown in FIG. 4, in order to reduce cache pollution (see, e.g., n:1 mux), there may be separate logic that is used to determine if an outgoing request will be allocated into the RBT 122. An embodiment may utilize a simple static lookup table of targets, but any prediction method could also be used (such as hit/miss counters indexed by target or by address).

Figure 5:
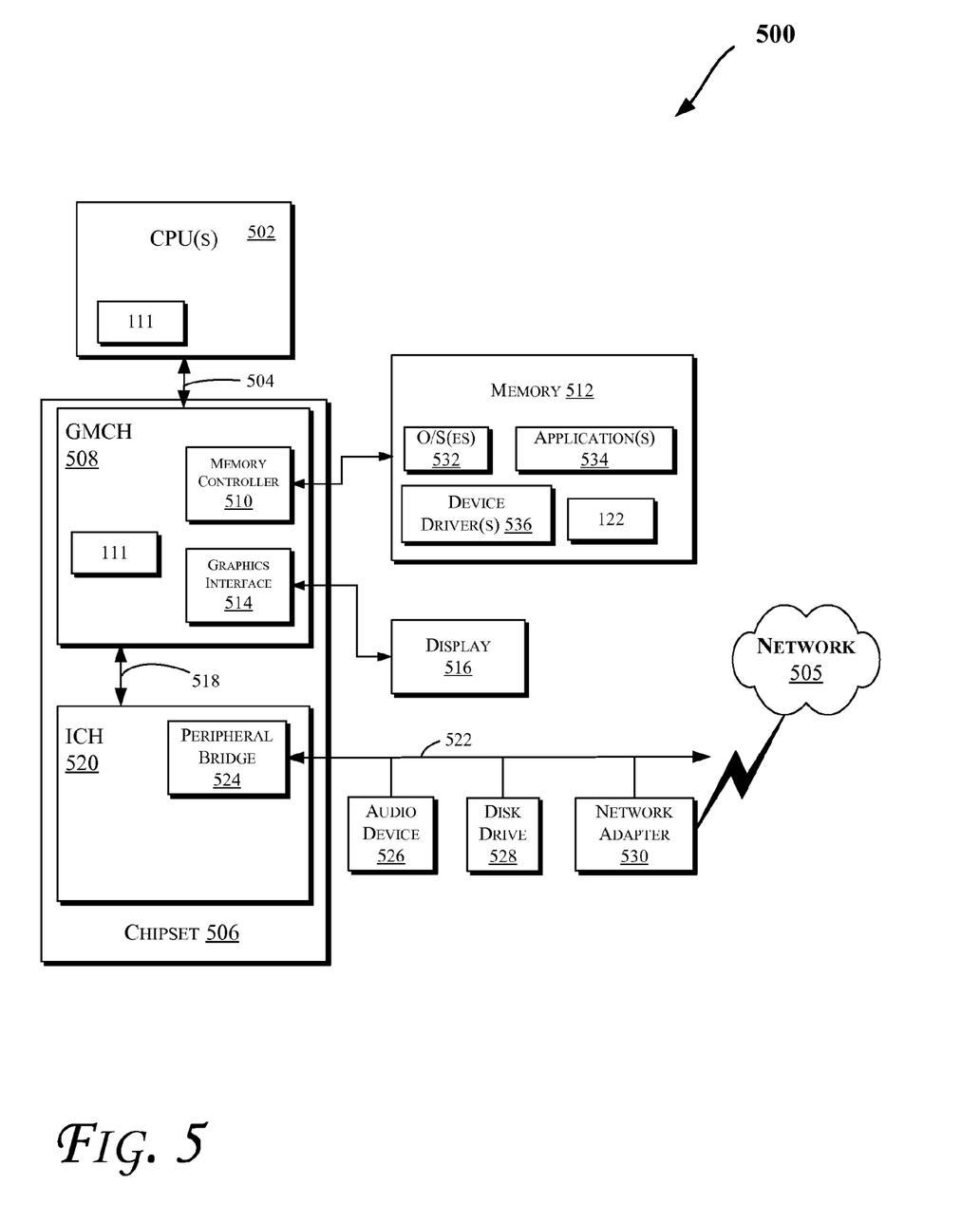

FIG. 5 illustrates a block diagram of an embodiment of a computing system 500. One or more of the agents 102 of FIG. 1 may comprise one or more components of the computing system 500. Also, various components of the system 500 may include an RBT 122 and/or a logic 111 as illustrated in FIG. 5. However, the RBT 122 and/or logic 111 may be provided in locations throughout the system 500, including or excluding those illustrated. The computing system 500 may include one or more central processing unit(s) (CPUs) 502 (which may be collectively referred to herein as "processors 502" or more generically "processor 502") coupled to an interconnection network (or bus) 504. The processors 502 may be any type of processor such as a general purpose processor, a network processor (which may process data communicated over a computer network 505), etc. (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

The processor 502 may include one or more caches (e.g., other than the RBT 122), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) may be located in various locations (e.g., inside other components to the computing systems discussed herein, including systems of FIG. 1, 2, 5, or 6).

A chipset 506 may additionally be coupled to the interconnection network 504. Further, the chipset 506 may include a graphics memory control hub (GMCH) 508. The GMCH 508 may include a memory controller 510 that is coupled to a memory 512. The memory 512 may store data, e.g., including sequences of instructions that are executed by the processor 502, or any other device in communication with components of the computing system 500. Also, in one embodiment of the invention, the memory 512 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 504, such as multiple processors and/or multiple system memories.

The GMCH 508 may further include a graphics interface 514 coupled to a display device 516 (e.g., via a graphics accelerator in an embodiment). In one embodiment, the graphics interface 514 may be coupled to the display device 516 via an accelerated graphics port (AGP). In an embodiment of the invention, the display device 516 (such as a flat panel display) may be coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 may couple the GMCH 508 to an input/output control hub (ICH) 520. The ICH 520 may provide an interface to input/output (I/O) devices coupled to the computing system 500. The ICH 520 may be coupled to a bus 522 through a peripheral bridge (or controller) 524, such as a peripheral component interconnect (PCI) bridge that may be compliant with the PCIe specification, a universal serial bus (USB) controller, etc. The bridge 524 may provide a data path between the processor 502 and peripheral devices. Other types of topologies may be utilized. Also, multiple buses may be coupled to the ICH 520, e.g., through multiple bridges or controllers. Further, the bus 522 may comprise other types and configurations of bus systems. Moreover, other peripherals coupled to the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 522 may be coupled to an audio device 526, one or more disk drive(s) 528, and a network adapter 530 (which may be a NIC in an embodiment). In one embodiment, the network adapter 530 or other devices coupled to the bus 522 may communicate with the chipset 506. Also, various components (such as the network adapter 530) may be coupled to the GMCH 508 in some embodiments of the invention. In addition, the processor 502 and the GMCH 508 may be combined to form a single chip. In an embodiment, the memory controller 510 may be provided in one or more of the CPUs 502. Further, in an embodiment, GMCH 508 and ICH 520 may be combined into a Peripheral Control Hub (PCH).

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 may include one or more of the following in an embodiment: an operating system (0/S) 532, application 534, directory 501, and/or device driver 536. The memory 512 may also include regions dedicated to Memory Mapped I/O (MMIO) operations. Programs and/or data stored in the memory 512 may be swapped into the disk drive 528 as part of memory management operations. The application(s) 534 may execute (e.g., on the processor(s) 502) to communicate one or more packets with one or more computing devices coupled to the network 505. In an embodiment, a packet may be a sequence of one or more symbols and/or values that may be encoded by one or more electrical signals transmitted from at least one sender to at least on receiver (e.g., over a network such as the network 505). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 505).

In an embodiment, the application 534 may utilize the O/S 532 to communicate with various components of the system 500, e.g., through the device driver 536. Hence, the device driver 536 may include network adapter 530 specific commands to provide a communication interface between the O/S 532 and the network adapter 530, or other I/O devices coupled to the system 500, e.g., via the chipset 506.

In an embodiment, the O/S 532 may include a network protocol stack. A protocol stack generally refers to a set of procedures or programs that may be executed to process packets sent over a network 505, where the packets may conform to a specified protocol. For example, TCP/IP (Transport Control Protocol/Internet Protocol) packets may be processed using a TCP/IP stack. The device driver 536 may indicate the buffers in the memory 512 that are to be processed, e.g., via the protocol stack.

The network 505 may include any type of computer network. The network adapter 530 may further include a direct memory access (DMA) engine, which writes packets to buffers (e.g., stored in the memory 512) assigned to available descriptors (e.g., stored in the memory 512) to transmit and/or receive data over the network 505. Additionally, the network adapter 530 may include a network adapter controller, which may include logic (such as one or more programmable processors) to perform adapter related operations. In an embodiment, the adapter controller may be a MAC (media access control) component. The network adapter 530 may further include a memory, such as any type of volatile/nonvolatile memory (e.g., including one or more cache(s) and/or other memory types discussed with reference to memory 512).

Figure 6:
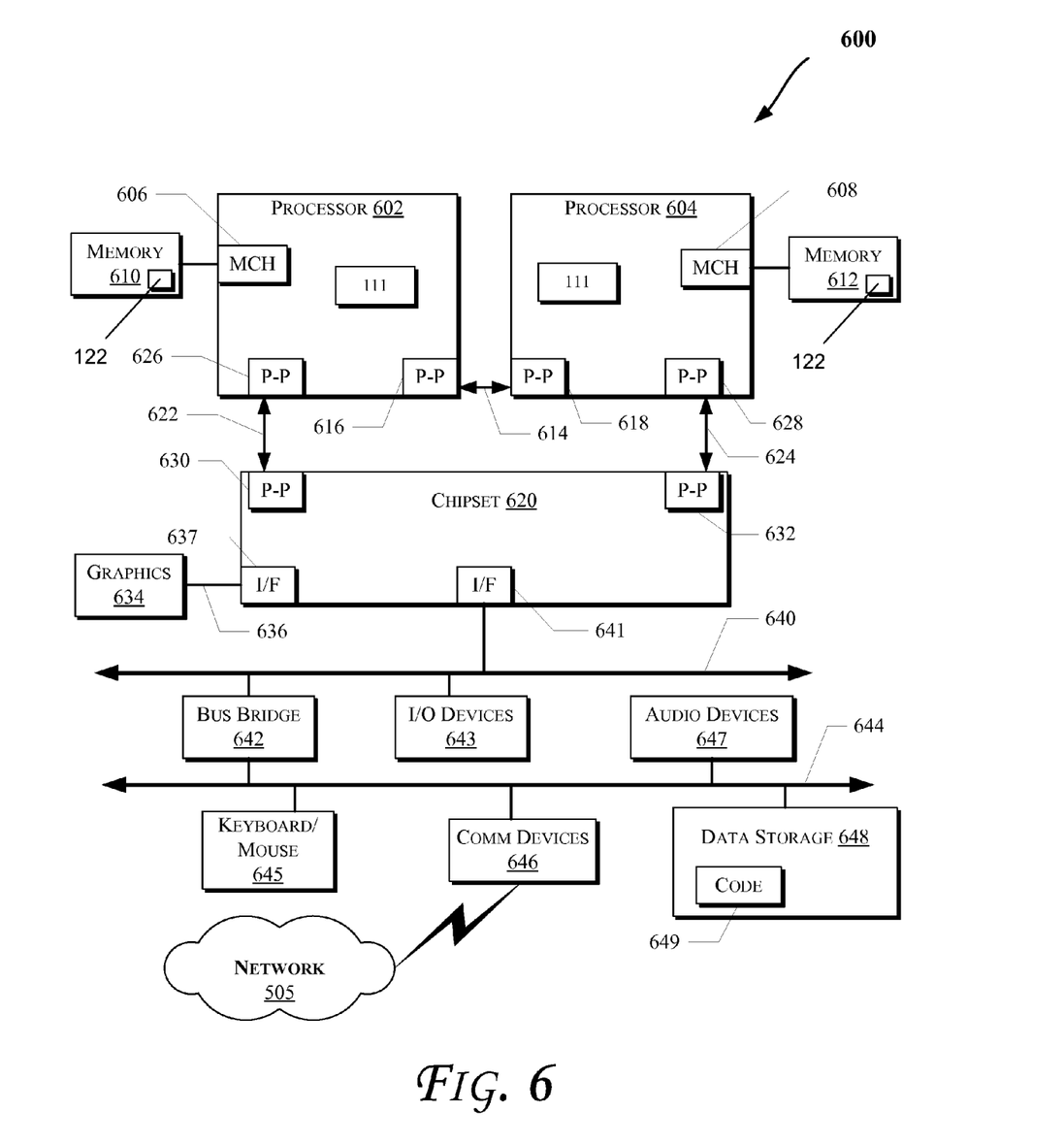

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (GMCH) 606 and 608 to enable communication with memories 610 and 612. The memories 610 and/or 612 may store various data such as those discussed with reference to the memory 612 of FIG. 6. As shown in FIG. 6, the processors 602 and 604 (or other components of system 600 such as chipset 620, I/O devices 643, etc.) may also include one or more cache(s) such as those discussed with reference to FIGS. 1-5.

In an embodiment, the processors 602 and 604 may be one of the processors 602 discussed with reference to FIG. 6. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, a directory cache and/or logic may be provided in one or more of the processors 602, 604 and/or chipset 620. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6. For example, various components of the system 600 may include the RBT 122) and/or a logic 111. However, the RBT 122 and/or logic 111 may be provided in locations throughout the system 600, including or excluding those illustrated.

The chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 505), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a first agent to transmit an outgoing request for data; and
   a route back table to store information in an entry of the route back table in response to the outgoing request for data, wherein the stored information is to comprise a request identifier and a destination identifier corresponding to the outgoing request of data,
   wherein, upon receipt of returned data in response to the outgoing request for data, the request identifier is to be used as an index and the destination identifier is to be used as a tag into the route back table, wherein the returned data is to be directly sent to the first agent in response to a determination that the entry is valid and the tag matches, and wherein the returned data is to be indirectly sent to the first agent in response to one or more of: a tag mismatch, the request indicating that data be returned indirectly, a read collision, a write collision, and a destination not being a current socket.

2. The apparatus of claim 1, wherein the route back table is to be shared amongst the first agent and one or more other agents.

3. The apparatus of claim 1, wherein the returned data is to be sent directly to the first agent at a same time or prior to sending the returned data to a cache bank.

4. The apparatus of claim 1, wherein the returned data is transmitted from an external socket.

5. The apparatus of claim 1, wherein the route back table is to comprise a read port and a write port.

6. The apparatus of claim 1, wherein the route back table is to be stored in a static random access memory device to allow for multiple write operations to a same location in the route back table in a same clock cycle or different clock cycles.

7. The apparatus of claim 1, wherein a defeature signal is to indicate whether to assume a tag match without checking for a tag in the route back table.

8. The apparatus of claim 1, wherein the returned data is to be indirectly sent to the first agent in response to one or more of: a tag mismatch due to the outgoing request being sent on a different link, a tag mismatch due to the tag being overwritten, and a tag mismatch due to the tag not having been written based on some function of a target.

9. The apparatus of claim 1, wherein the first agent is to comprise a processor core.

10. The apparatus of claim 1, further comprising a directory cache, coupled to the first agent, to store data corresponding to a plurality of caching agents coupled to the first agent.

11. The apparatus of claim 1, wherein the first agent and the route back table are on a same integrated circuit die.

12. A method comprising:
    receiving an outgoing request for data from a first agent;
    storing information in an entry of a route back table in response to the outgoing request for data, wherein the stored information is to comprise a request identifier and a destination identifier corresponding to the outgoing request of data;
    upon receipt of returned data in response to the outgoing request for data, utilizing the request identifier as an index and the destination identifier as a tag into the route back table; and
    transmitting the returned data directly to the first agent in response to a determination that the entry is valid and the tag matches, wherein the returned data is indirectly sent to the first agent in response to one or more of: a tag mismatch, the request indicating that data be returned indirectly, a read collision, a write collision, and a destination not being a current socket.

13. The method of claim 12, further comprising sharing the route back table amongst the first agent and one or more other agents.

14. The method of claim 12, further comprising sending the returned data directly to the first agent at a same time or prior to sending the returned data to a cache bank.

15. The method of claim 12, further comprising storing the route back table in a static random access memory device to allow for multiple write operations to a same location in the route back table in a same clock cycle or different clock cycles.

16. The method of claim 12, further comprising transmitting the returned data indirectly to the first agent in response to one or more of: a tag mismatch due to the outgoing request being sent on a different link, a tag mismatch due to the tag being overwritten, a tag mismatch due to the tag not having been written based on some function of a target, and a tag mismatch due to the tag not having been written based on some function of a target.

17. A system comprising:
    a memory to store a route back table;
    a first agent, coupled to the memory, to transmit an outgoing request for data, wherein the route back table is to store information in an entry of the route back table in response to the outgoing request for data, wherein the stored information is to comprise a request identifier and a destination identifier corresponding to the outgoing request of data; and
    a second agent to transmit returned data in response to the outgoing request for data, wherein the request identifier is to be used as an index and the destination identifier is to be used as a tag into the route back table, wherein the returned data is to be directly sent to the first agent in response to a determination that the entry is valid and the tag matches, and wherein the returned data is to be indirectly sent to the first agent in response to one or more of: a tag mismatch, the request indicating that data be returned indirectly, a read collision, a write collision, and a destination not being a current socket.

18. The system of claim 17, wherein the route back table is to be shared between the first agent and the second agent.

19. The system of claim 17, wherein the returned data is to be sent directly to the first agent at a same time or prior to sending the returned data to a cache controller.

20. The system of claim 17, wherein the returned data is to be indirectly sent to the first agent in response to one or more of: a tag mismatch due to the outgoing request being sent on a different link, a tag mismatch due to the tag being overwritten, a tag mismatch due to the tag not having been written based on some function of a target, and a tag mismatch due to the tag not having been written based on some function of a target.

* * * * *